US011852942B2

(12) United States Patent
Wang et al.

(10) Patent No.: US 11,852,942 B2
(45) Date of Patent: Dec. 26, 2023

(54) DISPLAY DEVICE AND DRIVING METHOD FOR DISPLAY DEVICE

(71) Applicants: Beijing BOE Display Technology Co., Ltd., Beijing (CN); BOE Technology Group Co., Ltd., Beijing (CN)

(72) Inventors: Mengjie Wang, Beijing (CN); Xiaona Liu, Beijing (CN); Yuqiong Chen, Beijing (CN); Rui Zhang, Beijing (CN); Yujia Sun, Beijing (CN); Jingjing Jiang, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/628,520

(22) PCT Filed: Apr. 8, 2021

(86) PCT No.: PCT/CN2021/085910
§ 371 (c)(1),
(2) Date: Jan. 19, 2022

(87) PCT Pub. No.: WO2021/238422
PCT Pub. Date: Dec. 2, 2021

(65) Prior Publication Data
US 2023/0070646 A1    Mar. 9, 2023

(30) Foreign Application Priority Data
May 29, 2020  (CN) .......................... 202010471881.0

(51) Int. Cl.
G02F 1/139    (2006.01)
G02F 1/1335   (2006.01)
G02F 1/133    (2006.01)

(52) U.S. Cl.
CPC ........ *G02F 1/1396* (2013.01); *G02F 1/13306* (2013.01); *G02F 1/133531* (2021.01);
(Continued)

(58) Field of Classification Search
CPC ..................................... G02F 1/1396
See application file for complete search history.

(56) References Cited

U.S. PATENT DOCUMENTS 5,168,378 A    12/1992  Black et al.
5,796,509 A     8/1998  Doany et al.
(Continued)

FOREIGN PATENT DOCUMENTS

CN    1493016 A    4/2004
CN    103558708 A   2/2014
(Continued)

OTHER PUBLICATIONS

CN202010471881.0 first office action.

*Primary Examiner* — Edmond C Lau
(74) *Attorney, Agent, or Firm* — IPro, PLLC

(57) ABSTRACT

Disclosed are a display device and a driving method for a display device. The display device includes a display component and a light control component. The light control component has a plurality of light control pixels arranged in an array. Each of the light control pixels at least covers one of the display pixels. Each of the light control pixels is configured to switch between a first state and a second state. When the light control pixel is in the first state, external ambient light that has passed through the first polarizer does not change polarization state after passing through the light control pixel. When the light control pixel is in the second state, external ambient light that has passed through the first polarizer is adjusted, after passing through the light control
(Continued)

pixel, to be linearly polarized light perpendicular to the light transmission axis of the reflective polarizer.

11 Claims, 5 Drawing Sheets

(52) U.S. Cl.
CPC .... *G02F 1/133536* (2013.01); *G02F 2203/02* (2013.01); *G02F 2203/07* (2013.01)

(56) References Cited

U.S. PATENT DOCUMENTS

| | | |
|---|---|---|
| 2004/0100598 A1 | 5/2004 | Adachi et al. |
| 2013/0342512 A1 | 12/2013 | Smith et al. |
| 2015/0036085 A1 | 2/2015 | Chen et al. |
| 2015/0177563 A1 | 6/2015 | Cho et al. |
| 2015/0302786 A1 | 10/2015 | Wang |
| 2017/0031206 A1 | 2/2017 | Smith et al. |
| 2018/0149918 A1 | 5/2018 | Yuan et al. |
| 2018/0284506 A1* | 10/2018 | Tsuda ................ G02F 1/13471 |
| 2018/0299726 A1* | 10/2018 | Oka ................ G02F 1/133528 |
| 2019/0265522 A1* | 8/2019 | Chen ................ G02F 1/13363 |

FOREIGN PATENT DOCUMENTS

| | | |
|---|---|---|
| CN | 103956364 A | 7/2014 |
| CN | 104111559 A | 10/2014 |
| CN | 104350417 A | 2/2015 |
| CN | 106526951 A | 3/2017 |
| CN | 108027530 A | 5/2018 |
| CN | 209821552 U | 12/2019 |
| JP | 2019191285 A | 10/2019 |
| TW | 546513 B | 8/2003 |

* cited by examiner

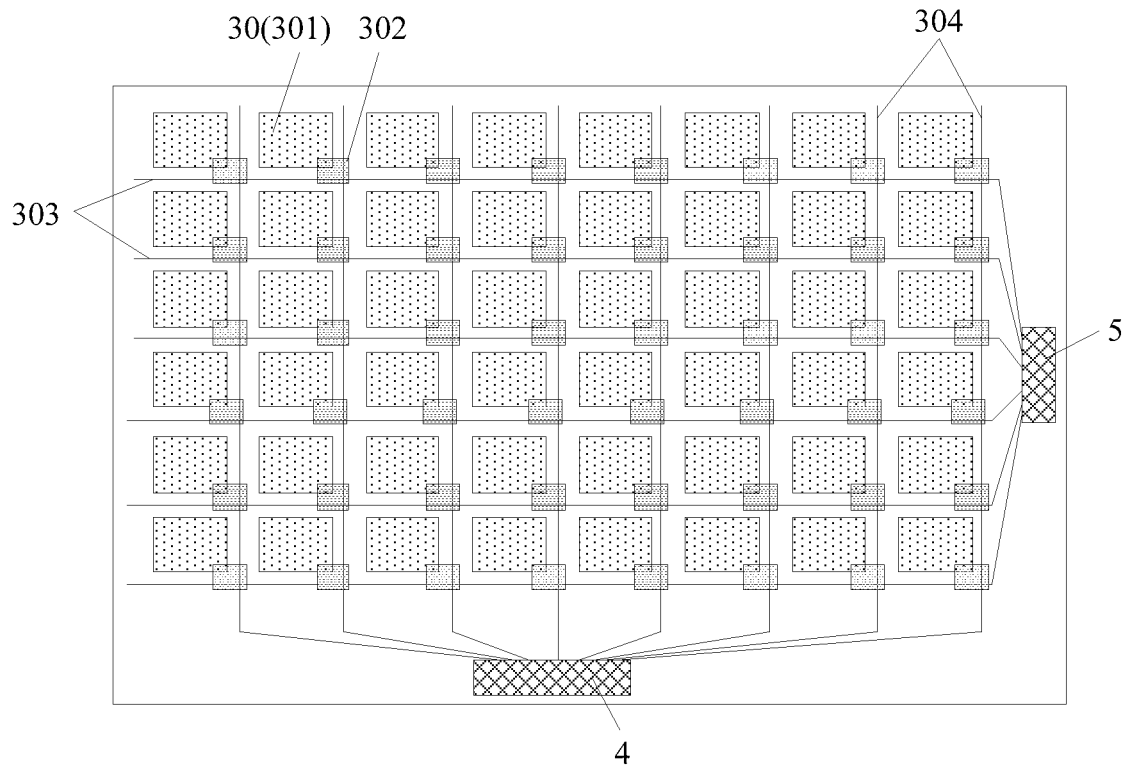

Fig. 6B

| Each light control pixel controls light of a corresponding display pixel to pass through so that a position of the light control pixel is displayed at a current moment, when the corresponding display pixel is for image display at the current moment | S100 |

| each light control pixel adjusts external ambient light passing through the first polarizer to be linearly polarized light perpendicular to the direction of the light transmission axis of the reflective polarizer so that the position of the light control pixel has a mirror function at the current moment, when the corresponding display pixel is not for image display at the current moment | S200 |

Fig. 7

DISPLAY DEVICE AND DRIVING METHOD FOR DISPLAY DEVICE

CROSS REFERENCE TO RELATED APPLICATIONS

This application is a National Stage of International Application No. PCT/CN2021/085910, filed on Apr. 8, 2021, which claims priority to Chinese Patent Application No. 202010471881.0, filed with the China National Intellectual Property Administration on May 29, 2020 and entitled "Display Device and Driving Method for Display Device", both of which are hereby incorporated by reference in their entireties.

FIELD

The present disclosure relates to the field of display technologies, and particularly to a display device and a driving method for the display device.

BACKGROUND

With continuous development of display technologies, a mirror display technology has gradually entered people's daily lives. A mirror display device in the related art may also reflect ambient light in the process of displaying images so that the mirror display device can be used as a mirror. However, the mirror display device in the related art cannot achieve an effect of real-time compatibility between mirror and display functions.

SUMMARY

The present disclosure provides a display device and a driving method for the display device to solve the problem that a mirror display device cannot achieve an effect of real-time compatibility between mirror and display functions in the related art.

An embodiment of the present disclosure provides a display device, including: a display component, including a plurality of display pixels arranged in an array; a reflective polarizer, located on a light emitting side of the display component, having a light transmission axis, and configured to reflect light with a polarization direction perpendicular to a direction of the light transmission axis and allow light with a polarization direction parallel to the direction of the light transmission axis to pass through; a first polarizer, located on a side, facing away from the display component, of the reflective polarizer, where a light transmission axis of the first polarizer is parallel to the light transmission axis of the reflective polarizer; and a light control component, located between the reflective polarizer and the first polarizer, and having a plurality of light control pixels arranged in an array, where each of the light control pixels covers at least one of the display pixels, each of the light control pixels is configured to switch between a first state and a second state, when the light control pixel is in the first state, external ambient light passing through the first polarizer does not change a polarization state after passing through the light control pixel, and when the light control pixel is in the second state, the external ambient light passing through the first polarizer is adjusted, after passing through the light control pixel, to be linearly polarized light perpendicular to the direction of the light transmission axis of the reflective polarizer.

In some embodiments, the light control component is a liquid crystal control panel or a micro-electromechanical control module.

In some embodiments, the light control component is the liquid crystal control panel; each of the display pixels includes a display pixel electrode, and each of the light control pixels includes a light control pixel electrode; and an orthographic projection of the display pixel electrode on the reflective polarizer overlaps an orthographic projection of the light control pixel electrode on the reflective polarizer.

In some embodiments, the liquid crystal control panel is a twisted nematic liquid crystal module.

In some embodiments, the light control component further includes: a plurality of signal lines extending in a first direction and a second direction that cross each other, and the signal lines define the plurality of light control pixels; and at least part of the signal lines are broken lines.

In some embodiments, the display component includes: a liquid crystal display panel; and the display device further includes a second polarizer, where the liquid crystal display panel is located between the second polarizer and the reflective polarizer.

In some embodiments, a direction of a light transmission axis of the second polarizer is perpendicular to the direction of the light transmission axis of the reflective polarizer.

In some embodiments, the display component further includes a backlight module, and the backlight module is located on a side, facing away from the liquid crystal display panel, of the second polarizer.

An embodiment of the present disclosure further provides a driving method for the display device provided by embodiments of the present disclosure, the driving method including: controlling, by each light control pixel, light of a corresponding display pixel to pass through so that a position of the light control pixel is displayed at a current moment, when the corresponding display pixel is for image display at the current moment; and adjusting, by each light control pixel, external ambient light passing through the first polarizer to be linearly polarized light perpendicular to the direction of the light transmission axis of the reflective polarizer so that the position of the light control pixel has a mirror function at the current moment, when the corresponding display pixel is not for image display at the current moment.

In some embodiments, when adjusting, by each light control pixel, the external ambient light to be the linearly polarized light perpendicular to the direction of the light transmission axis of the reflective polarizer, the driving method further includes: the display pixel corresponding to the light control pixel is in a light blocking state.

In some embodiments, when controlling, by each light control pixel, the light of the corresponding display pixel to pass through when the corresponding display pixel is for image display at the current moment, the driving method further includes: at the same time, adjusting, by the light control pixel, the external ambient light passing through the first polarizer to be linearly polarized light parallel to the direction of the light transmission axis of the reflective polarizer.

In some embodiments, before controlling, by each light control pixel, the light of the display pixel to pass through when the corresponding display pixel is for image display at the current moment, the driving method further includes: determining, according to a display image to be displayed, a first display pixel among the display pixels for display; and controlling a light control pixel corresponding to the first display pixel to be in the first state, and controlling remaining light control pixels to be in the second state.

BRIEF DESCRIPTION OF THE DRAWINGS

FIG. 6B is another schematic structural diagram of a liquid crystal control panel provided by an embodiment of the present disclosure.

FIG. 7 is a schematic diagram of a driving process of a display device provided by an embodiment of the present disclosure.

DETAILED DESCRIPTION OF EMBODIMENTS

In order to make the objectives, technical solutions, and advantages of embodiments of the present disclosure clearer, the technical solutions of embodiments of the present disclosure will be described clearly and completely with reference to accompanying drawings of embodiments of the present disclosure. Obviously, the described embodiments are part of, rather than all of, embodiments of the present disclosure. Based on the described embodiments of the present disclosure, all other embodiments obtained by those ordinarily skilled in the art without creative labor fall within the protection scope of the present disclosure.

Unless otherwise defined, technical or scientific terms used in the present disclosure shall have the general meanings understood by those with ordinary skills in the field to which the present disclosure belongs. "First", "second" and similar words used in the present disclosure do not indicate any order, quantity or importance, but are only used to distinguish different components. "Comprise" or "include" or other similar words mean that the element or item appearing before the word encompasses the element or item listed after the word and its equivalents, but does not exclude other elements or items. "Connecting" or "connected" or other similar words are not limited to physical or mechanical connections, but may include electrical connections, whether direct or indirect. "Upper", "lower", "left", "right", etc. are only used to indicate a relative position relationship which may change accordingly when the absolute position of an object being described changes.

In order to keep the following description of embodiments of the present disclosure clear and concise, the present disclosure omits detailed descriptions of known functions and known components.

Figure 1:
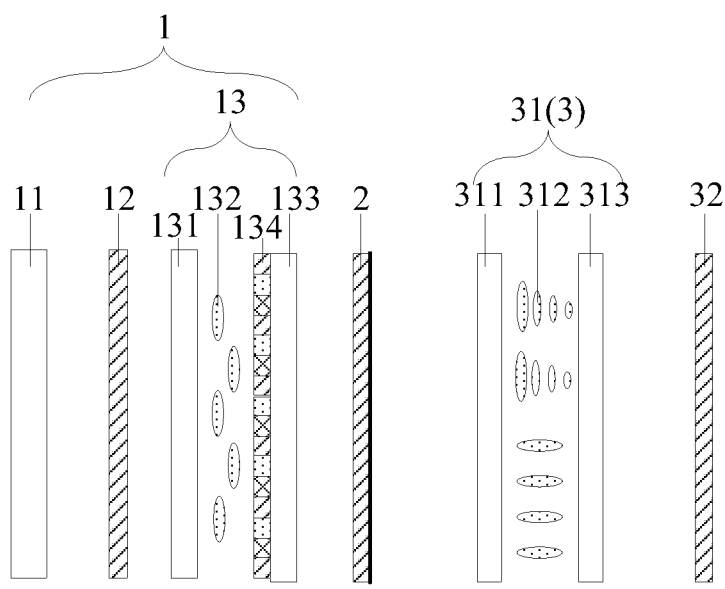
FIG. 1 is a schematic structural diagram of a display device provided by an embodiment of the present disclosure.
Figure 5A:
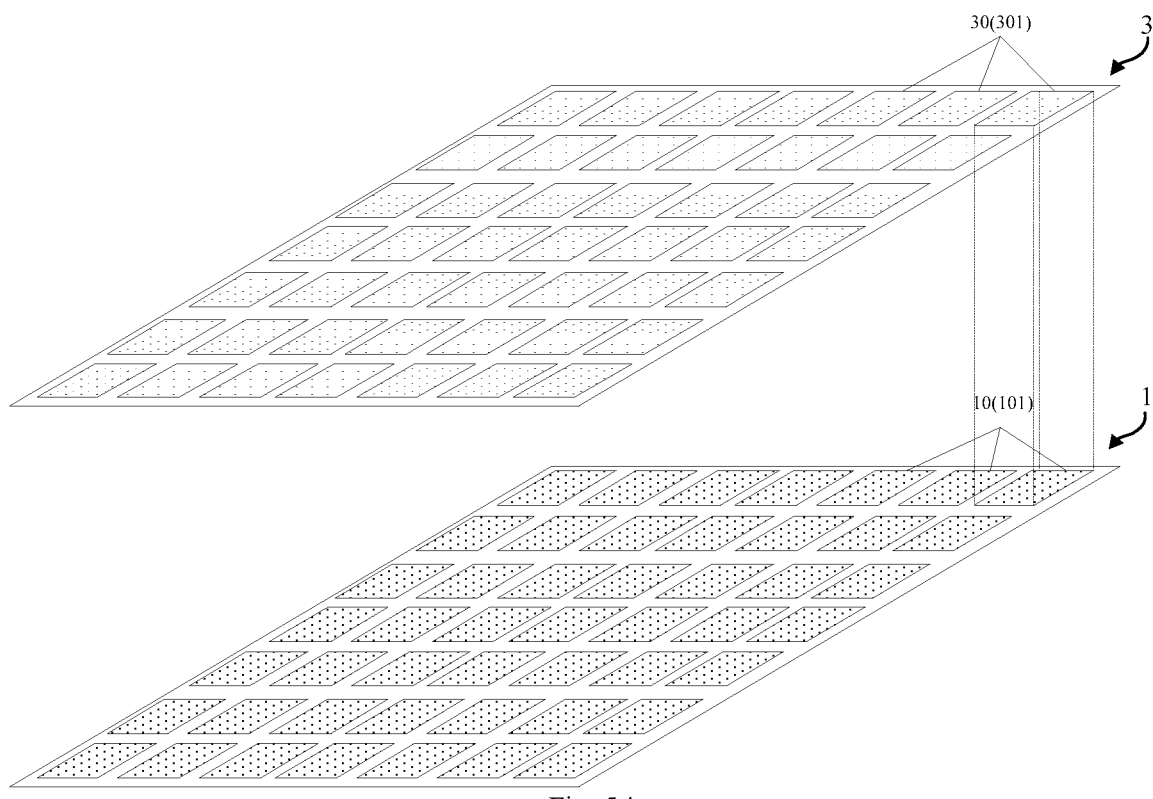
FIG. 5A is a schematic structural diagram of a one-to-one correspondence between display pixels and light control pixels provided by an embodiment of the present disclosure.
Figure 5B:
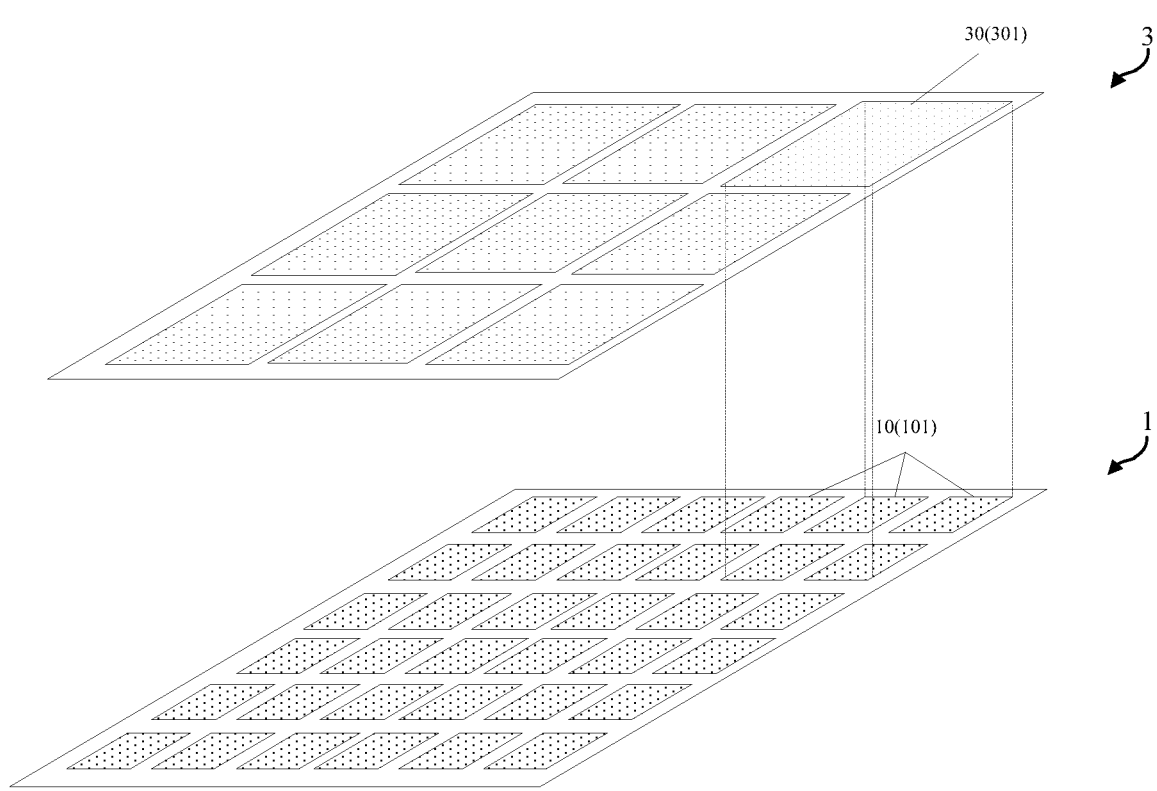
FIG. 5B is a schematic structural diagram of a light control pixel covering a plurality of display pixels provided by an embodiment of the present disclosure.

Referring to FIG. 1, FIG. 5A and FIG. 5B, an embodiment of the present disclosure provides a display device, including following components.

A display component 1 includes a plurality of display pixels 10 arranged in an array, the display pixels 10 are configured to display according to content to be displayed.

A reflective polarizer 2 is located on a light emitting side of the display component 1, has a light transmission axis (not shown in the drawings), and is configured to reflect light with a polarization direction perpendicular to a direction of the light transmission axis and allow light with a polarization direction parallel to the direction of the light transmission axis to pass through.

A first polarizer 32 is located on a side, facing away from the display component 1, of the reflective polarizer 2, a light transmission axis of the first polarizer 32 is parallel to the light transmission axis of the reflective polarizer 2.

A light control component 3 is located between the reflective polarizer 2 and the first polarizer 32, and has a plurality of light control pixels 30 arranged in an array. Each of the light control pixels 30 covers at least one of the display pixels 10. Each of the light control pixels 30 is configured to switch between a first state and a second state. When the light control pixel is in the first state, external ambient light passing through the first polarizer 32 does not change a polarization state after passing through the light control pixel 30. When the light control pixel is in the second state, the external ambient light passing through the first polarizer 32 is adjusted to be linearly polarized light perpendicular to the direction of the light transmission axis of the reflective polarizer 2. The first state may be a state corresponding to the display pixel during display, and the second state may be a state corresponding to the display pixel during non-display. That is, each light control pixel 30 is configured to control, when the corresponding display pixel 10 is for image display at the current moment, light of the display pixel 10 to pass through, and the external ambient light passing through the first polarizer 32 does not change the polarization state after passing through the light control pixel 30 so that a position of the light control pixel 30 is displayed at the current moment; and each light control pixel 30 is configured to adjust, when the corresponding display pixel 10 is not for image display at the current moment, the external ambient light passing through the first polarizer 32 to be the linearly polarized light perpendicular to the direction of the light transmission axis of the reflective polarizer 2 so that the position of the light control pixel 30 has a mirror function at the current moment.

In the display device provided by embodiments of the present disclosure, the light control component 3 has the plurality of light control pixels 30 arranged in the array, and each of the light control pixels 30 covers at least one of the display pixels 10, that is, one light control pixel 30 covers at least one display pixel 10. When the display pixel 10 is for display, the light emitted from the display pixel 10 may pass through the corresponding light control pixel 30 to realize display of a required display image. When the display pixel 10 is not for display, the corresponding light control pixel 30 may adjust the external ambient light passing through the first polarizer 32 to be the linearly polarized light perpendicular to the direction of the transmission axis of the reflective polarizer, so that the position of the display pixel 10 that is not for display in the current stage has the mirror function. Thus, for the whole display device, the image required to be displayed may be displayed by the display pixel 10 at the corresponding position, and positions other than the display position may have the mirror function through the light control pixels 30 and the reflective polarizer 2. Thus, the display device may have the mirror function in real time while performing display. Compared with the related art that a light control component 3 only has a whole electrode with a large area, the display device may only either in a full display state or a full mirror state, and cannot be used as a mirror while performing display, and positions with a mirror function cannot change in real time along with change of displayed content, that is, the display function and the mirror function are not compatible, the display device provided by embodiments of the present disclosure may improve an effect that the mirror display device in the related art cannot achieve the compatibility of the mirror and the display functions.

It should be noted that FIG. 5A and FIG. 5B are to illustrate corresponding relationships between the display pixels 10 and the light control pixels 30, and thus only show the display component 1 and the light control component 3. Embodiments of the present disclosure are not limited to this, and specific components of the display device may refer to FIG. 1.

In some embodiments, when the light control pixel is configured to adjust the external ambient light to be the linearly polarized light perpendicular to the direction of the light transmission axis of the reflective polarizer, the display pixel corresponding to the light control pixel is configured to be in a light blocking state. In embodiments of the present disclosure, the display pixel that is not for display may be in the light blocking state, namely, in a black state, which may further prevent light from being emitted from positions for a mirror and affecting the mirror function, and at the same time, may also reduce power consumption of the display device.

In some embodiments, referring to FIG. 1, FIG. 5A and FIG. 5B, the display component 1 in embodiments of the present disclosure may include: a liquid crystal display panel 13. In addition, the display device further includes a second polarizer 12, and the liquid crystal display panel 13 is located between the second polarizer 12 and the reflective polarizer 2. A direction of a light transmission axis of the second polarizer 12 is perpendicular to the direction of the light transmission axis of the reflective polarizer 2. The display component 1 may further include: a backlight module 11, and the backlight module 11 is located on a side, facing away from the liquid crystal display panel 13, of the second polarizer 12. The liquid crystal display panel 13 may be a Twisted Nematic (TN) liquid crystal module, or an In Plane Switching (IPS) liquid crystal module, or an Advanced Super Dimension Switch (ADS) liquid crystal module. For example, if the liquid crystal display panel 13 is the TN liquid crystal module, the liquid crystal display panel 13 may include a first substrate 131 and a second substrate 133 disposed opposite to each other, and a first liquid crystal layer 132 located between the first substrate 131 and the second substrate 131. The second substrate 133 may be located on a side, away from the backlight module 11, of the first substrate 131. The first substrate 131 may be an array substrate, and may include a plurality of display pixel electrodes 101 arranged in an array. The second substrate 133 may be a color film substrate, and may include a first common electrode of a whole surface. The second substrate 133 may also be provided with a color film layer 134. The first liquid crystal layer 132 may be deflected correspondingly according to a voltage applied to the display pixel electrodes and the first common electrode. If the liquid crystal display panel 13 is the ADS liquid crystal module, the liquid crystal display panel 13 may include a first substrate 131 and a second substrate 133 disposed to each other, and a first liquid crystal layer 132 located between the first substrate 131 and the second substrate 133. The second substrate 133 may be located on a side, away from the backlight module 11, of the first substrate 131. The first substrate 131 may be an array substrate, and may include a plurality of display pixel electrodes 101 arranged in an array. At the same time, the first substrate 131 may further be provided with a first common electrode, and the display pixel electrodes 101 may be located on a different layer from the first common electrode. The first liquid crystal layer 132 may be deflected correspondingly according to a voltage applied to the display pixel electrodes and the first common electrode. Of course, the display component 1 may also be other light emitting structures capable of emitting polarized light in the same direction as the light transmission axis of the reflective polarizer 2 as required so that the emitted light may pass through the reflective polarizer 2 during display.

In some embodiments, the light control component in embodiments of the present disclosure may be a liquid crystal control panel, or a micro-electromechanical control module, to realize real-time adjustment of positions as the mirror function according to different display content of the display component 1.

In some embodiments, as shown in FIG. 1, FIG. 5A and FIG. 5B, the light control component 3 is a liquid crystal control panel 31. The liquid crystal control panel 31 may include a third substrate 311 and a fourth substrate 313 disposed opposite to each other, and a second liquid crystal layer 312 located between the third substrate 311 and the fourth substrate 313. The fourth substrate 313 may s be located on a side, away from the display component 1, of the third substrate 311. The third substrate 311 may be an array substrate having a plurality of light control pixel electrodes 301 arranged in an array. The fourth substrate 313 may be a substrate excluding the color film layer, and has a second common electrode of a whole surface. The liquid crystal control panel 31 is a twisted nematic liquid crystal module. When the second common electrode and the light control pixel electrodes are applied with the voltage, the liquid crystal control panel 31 is in an on state, and a vibration state of polarized light is not changed. When no voltage is applied to the second common electrode and the light control pixel electrodes, the liquid crystal control panel 31 is in an off state, acts as a half-wave plate, and may rotate the vibration direction of polarized light passing through by 90 degrees.

Figure 2:
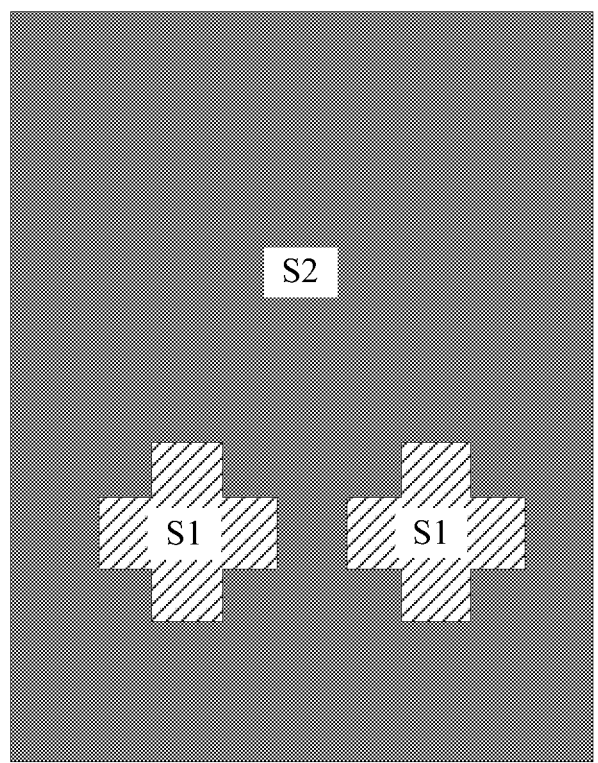
FIG. 2 is a schematic diagram of a display image provided by an embodiment of the present disclosure.
Figure 3:
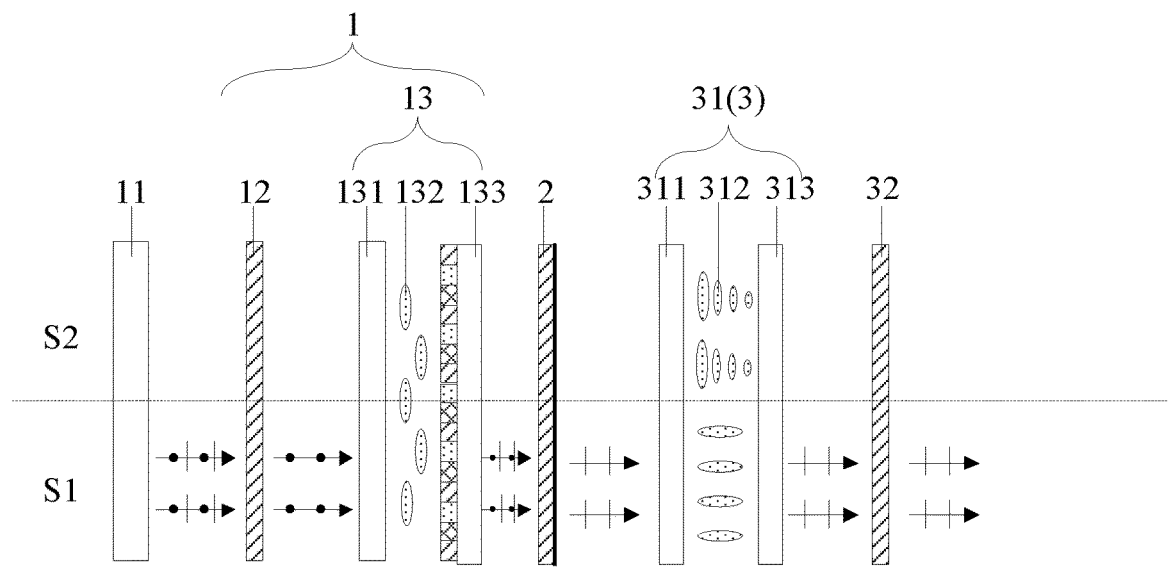
FIG. 3 is a schematic diagram of a principle of pixels at different positions during emitting provided by an embodiment of the present disclosure.
Figure 4:
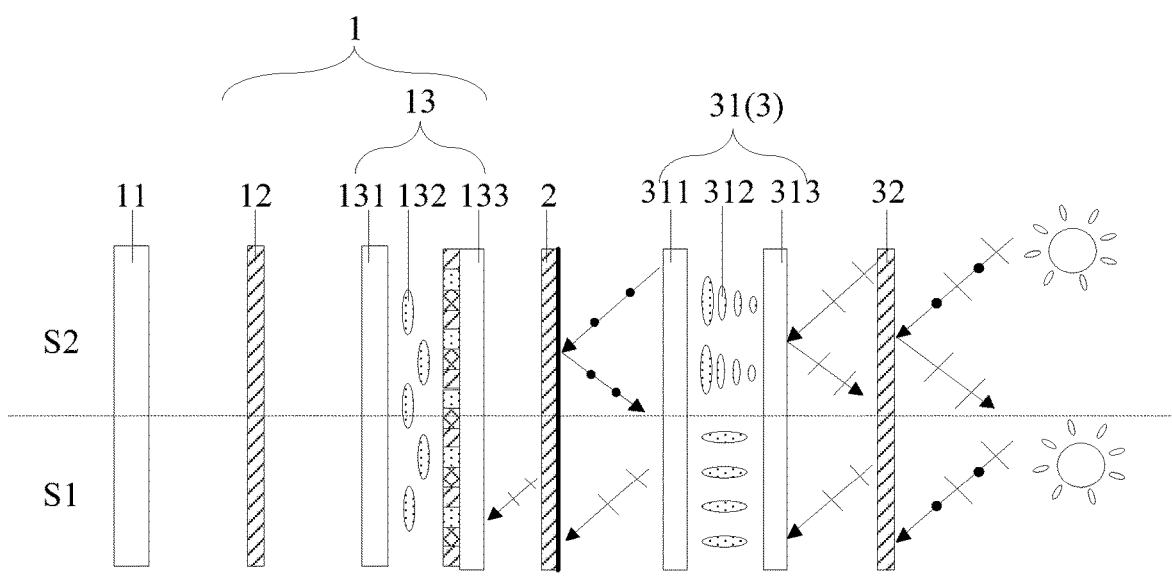
FIG. 4 is a schematic diagram of a principle of pixels at different positions during incidence of external light provided by an embodiment of the present disclosure.

Referring to FIG. 2 to FIG. 4, taking the display component 1 including the backlight module 11, the second polarizer 12 and the liquid crystal display panel 13, the liquid crystal display panel 13 being the ADS liquid crystal module, the light control component 3 being the liquid crystal control panel 31, and the liquid crystal control panel 31 being the TN liquid crystal module as an example, a display process of the display device provided by embodiments of the present disclosure is described as follows.

As shown in FIG. 2, the display device needs to display "+" in first regions S1, and a second region S2 other than the first regions S1 may be used as a mirror. For the display pixels required for display (namely pixels of the first regions S1 in FIG. 3), by applying the voltage to the display pixel electrodes 101 and the first common electrode of the liquid crystal display panel 13 at corresponding positions, and applying the voltage to the corresponding light control pixel electrodes 301 and the second common electrode of the liquid crystal control panel 31, the liquid crystal display panel 13 may convert the linearly polarized light into elliptically polarized light, and the liquid crystal control panel 31 may allow the light to pass through. A process of light emitted by the backlight module reaching the human eye may be: the light is emitted by the backlight module 11, and passes through the second polarizer 12, linearly polarized light in the same direction as the light transmission axis of the second polarizer 12 is emitted, the liquid crystal display panel 13 converts the linearly polarized light into elliptically polarized light, and after the elliptically polarized light passes through the reflective polarizer 2, linearly polarized light in the same direction as the light transmission axis of the reflective polarizer 2 is emitted; when passing through the liquid crystal control panel 31, since the liquid crystal control panel 31 at this position is in the on state, the linearly polarized light passes through; and when passing through the first polarizer 32, since the light transmission axis of the first polarizer 32 is consistent with the light transmission axis of the reflective polarizer 2, the linearly polarized light may finally be emitted through the first polarizer 32 to be viewed by the human eye. A propagation process of light emitted from the external ambient light may be: for the external ambient light (corresponding to light entering the first regions S1 from the right side in FIG. 4), when passing through the first polarizer 32, the external ambient light may be converted to be linearly polarized light in the same direction as the light transmission axis of the first polarizer 32; when the linearly polarized light passes through the liquid crystal control panel 31, since the liquid crystal control panel 31 is applied with the voltage and is in the on state, the linearly polarized light passes through; and when passing through the reflective polarizer 2, since the polarization direction of the linearly polarized light is consistent with the direction of the light transmission axis of the reflective polarizer 2, the linearly polarized light may also pass through the reflective polarizer 2, and therefore positions corresponding to the display pixels may not be reflected, and the display function may be realized.

For display pixels required to function as a mirror (namely pixels of the second region S2 as shown in FIG. 3), the display pixel electrodes 101 and the first common electrode of the liquid crystal display panel 13 may not be applied with the voltage at the corresponding position, and the corresponding light control pixel electrodes 301 and the second common electrode of the liquid crystal control panel 31 may not be applied with the voltage at the corresponding position either, that is, the display component 1 does not emit light. For the external ambient light at this position (corresponding to light entering the second region S2 from the right side in FIG. 4), when passing through the first polarizer 32, the external ambient light may be converted into linearly polarized light in the same direction as the light transmission axis of the first polarizer 32. When the linearly polarized light passes through the liquid crystal control panel 31 in the off state, the polarization state of the linearly polarized light may be rotated by 90 degrees by the liquid crystal control panel 31. When the rotated polarized light reaches the reflective polarizer 2, since the polarized light is perpendicular to the light transmission axis of the reflective polarizer 2, the polarized light is reflected by the linear polarizer 2, and the reflected linearly polarized light passes through the liquid crystal control panel 31 in the off state and then is converted into linearly polarized light in the same direction as the light transmission axis of the first polarizer 32 again, so as to pass through the first polarizer 32 to be reflected to the human eye, realizing the mirror function of the display pixels at this position.

In some embodiments, referring to FIG. 5A, when the light control component 3 is the liquid crystal control panel 31, each light control pixel 30 covers one display pixel 10. In embodiments of the present disclosure, each light control pixel 30 covers one display pixel 10, that is, the light control pixels 30 correspond to the display pixels 10 in a one-to-one correspondence, so that light transmission of each display pixel 10 may be accurately controlled, and the function that positions other than the display position are all used as a mirror may be accurately realized. Each display pixel 10 includes one display pixel electrode 101, and each light control pixel 30 includes one light control pixel electrode 301; and orthographic projections of the display pixel electrodes 101 on the reflective polarizer 2 overlap orthographic projections of the light control pixel electrodes 301 on the reflective polarizer 2.

Of course, in some embodiments, referring to FIG. 5B, when the light control component 3 is the liquid crystal control panel 31, each light control pixel 30 covers four display pixels 10. In embodiments of the present disclosure, since the light control component 3 is not used for specific display, each light control pixel 30 may cover four display pixels 10, thereby reducing the manufacturing difficulty and cost of the light control component. Of course, in some embodiments, each light control pixel 30 may also cover display pixels 10 of other quantities; for example, each light control pixel 30 may also cover two display pixels 10, or eight display pixels 10, which is not limited here in the present disclosure.

Figure 6A:
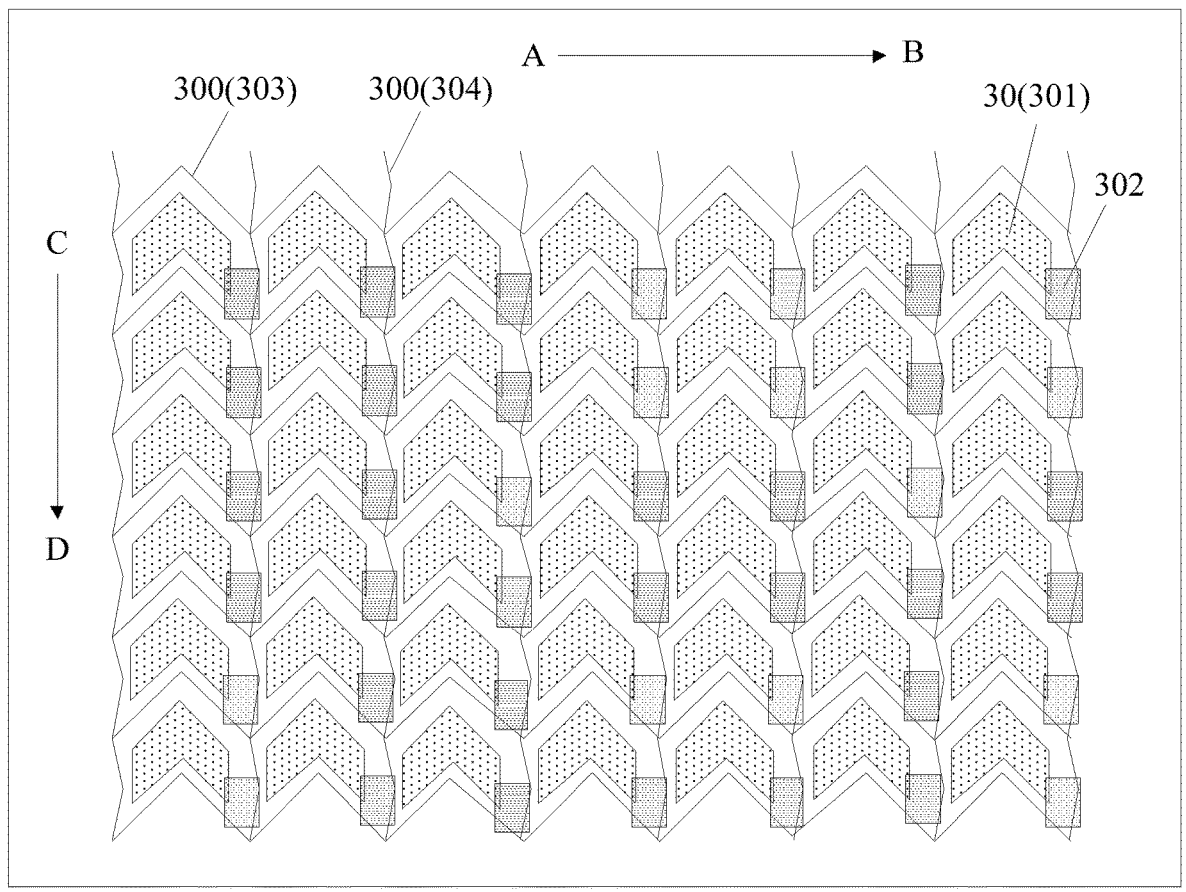
FIG. 6A is a schematic structural diagram of a liquid crystal control panel provided by an embodiment of the present disclosure.

In some embodiments, referring to FIG. 6A, FIG. 6A may be a schematic top view of the third substrate 311 of the liquid crystal control panel 31. The light control component 3 further includes: a plurality of signal lines 300 extending in a first direction AB and a second direction CD that cross each other. For example, the signal lines 300 include gate lines 303 extending in the first direction AB, and data lines 304 extending in the second direction CD. The signal lines 300 define the plurality of light control pixels 30 (which may be the light control pixel electrodes 301 therein). At least part of the signal lines 300 are broken lines. In embodiments of the present disclosure, at least part of the signal lines 300 of the light control component 3 are broken lines, and patterns of the defined light control pixel electrodes 301 are non-rectangular, while signal lines of the display component 1 may be conventional straight lines, and patterns of the display pixel electrodes 101 may be in a conventional rectangular shape. In this way, the signal lines of the light control component 3 and the signal lines of the display component 1, as well as the light control pixel electrodes 301 and the display pixel electrodes 101, have different or similar patterns, so the human eye may not feel moire, and thus the display device may have an effect of eliminating or improving the moire.

Of course, in some embodiments, the signal lines and the light control pixel electrodes 301 of the light control component 3 may also be in regular shapes. For example, referring to FIG. 6B which may be a schematic top view of the third substrate 311 of the liquid crystal control panel 31, the light control component 3 further includes light control pixel circuits 302 electrically connected with the light control pixels 30 (which may be the light control pixel electrodes 301 therein) in a one-to-one correspondence. The light control pixel circuits 302 may specifically include transistors. The light control component 3 may further include: gate lines 303 electrically connected with the light control pixel circuits 302 to provide scan signals for the light control pixels 30, and data line 304 electrically connected with the light control pixel circuits 302 to provide data signals for the light control pixels 30. If the light control pixel circuits 302 include the transistors, gates of the transistors may be electrically connected with the gate lines 303, sources of the transistors may be electrically connected with the data lines 304, and drains of the transistors may be electrically connected with the light control pixel electrodes 301 to realize specific and individual control over each of the light control pixel electrodes 301.

In some embodiments, referring to FIG. 7, an embodiment of the present disclosure further provides a driving method for the display device as provided by embodiments of the present disclosure. The driving method includes following steps.

S100, each light control pixel controls light of a corresponding display pixel to pass through so that a position of the light control pixel is displayed at a current moment, when the corresponding display pixel is for image display at the current moment.

S200, each light control pixel adjusts external ambient light passing through the first polarizer to be linearly polarized light perpendicular to the direction of the light transmission axis of the reflective polarizer so that the position of the light control pixel has a mirror function at the current moment, when the corresponding display pixel is not for image display at the current moment.

In some embodiments, when step S200 is performed, that is, when each light control pixel adjusts the external ambient light to be the linearly polarized light perpendicular to the direction of the light transmission axis of the reflective polarizer, the driving method further includes: the display pixel corresponding to the light control pixel is in a light blocking state. In embodiments of the present disclosure, the display pixel that is not for display may be in the light blocking state, that is, in a black state, which may further prevent light from being emitted from positions that need to have a mirror and affecting the mirror function, and at the same time, may also reduce the power consumption of the display device.

In some embodiments, while step S100 is performed, that is, when each light control pixel controls the light of the corresponding display pixel to pass through when the corresponding display pixel is for image display at the current moment, the driving method further includes: at the same time, the light control pixels adjust the external ambient light passing through the first polarizer to be the linearly polarized light parallel to the direction of the light transmission axis of the reflective polarizer. In embodiments of the present disclosure, for the display pixel required for display, the light control pixel at the corresponding position may allow light entering from a backlight module side to pass through on one hand, and may also convert light entering from a first polarizer side to be the linearly polarized light parallel to the direction of the light transmission axis of the reflective polarizer on the other hand, that is, the external ambient light at the position is not reflected.

In some embodiments, before step S100, that is, before each light control pixel controls the light of the corresponding display pixel to pass through when the corresponding display pixel is for image display at the current moment, the driving method may further include following steps.

Step S300, a first display pixel among the display pixels is determined for display according to a display image to be displayed, that is, the first display pixel is a pixel, required for display at the current moment, among the display pixels.

Step S400, a light control pixel corresponding to the first display pixel is controlled to be in the first state so that light of the first display pixel may pass through, and the remaining light control pixels are controlled to be in the second state. Thus, at positions not required for display, the external ambient light passing through the first polarizer is adjusted to be the linearly polarized light perpendicular to the direction of the light transmission axis of the reflective polarizer to realize the mirror function.

In some embodiments, the display image to be displayed may include a plurality of mutually spaced patterns. For example, as shown in FIG. 2, the display image to be displayed may include two spaced "+" patterns, regions where "+" are located are displayed through display pixels at corresponding positions, and a region other than "+" is used as a mirror region, and is realized by control of the light control pixels over the external ambient light.

In some embodiments of the present disclosure, the display component and the light control component are respectively controlled by a logic board Tcon and/or an IC chip, and front-end signal transmission is synchronized. The liquid crystal display panel of the display component is applied with a sweep voltage to control display. The liquid crystal control panel of the light control component is applied with a pulse (a pulse voltage, a high voltage and 0V are switched). For a region, required for display, of the liquid crystal display panel, namely corresponding to 1-255 gray scale display, the liquid crystal control panel synchronously switches on transistors TFT separately, and is applied with the high voltage to realize image display in this region. For a region, not required for display, of the liquid crystal display panel, namely a region corresponding to 0 gray scale, the liquid crystal control panel synchronously switches off a transistor TFT in the corresponding region, and is not applied with voltage (0V) to realize a mirror effect of the corresponding region.

The beneficial effects of embodiments of the present disclosure are as follows: in the display device provided by embodiments of the present disclosure, the light control component has the plurality of light control pixels arranged in the array, and each light control pixel covers at least one display pixel, that is, one light control pixel covers at least one display pixel. When the display pixel is for display, the corresponding light control pixel may allow the light emitted by the display pixel to pass through to realize display of the required display image. When the display pixel is not for display, the corresponding light control pixel may adjust the external ambient light to be the linearly polarized light perpendicular to the direction of the light transmission axis of the reflective polarizer, so the display pixel that is not for display in the current stage can have the mirror function. Furthermore, for the whole display device, the image required for display can be displayed by the display pixel at the corresponding position, and the positions other than the display position can have the mirror function through the light control pixel and the reflective polarizer. Thus, the display device can have the mirror function while performing display, which improves the effect that the mirror display device in the related art cannot realize the compatibility of the mirror and the display functions.

It will be apparent to those skilled in the art that various modifications and variations can be made in the present disclosure without departing from the spirit or scope of the present disclosure. Thus, it is intended that the present disclosure cover the modifications and variations of the present disclosure provided they come within the scope of the appended claims and their equivalents.

What is claimed is:

1. A display device, comprising:
a display component, comprising a plurality of display pixels arranged in an array;
a reflective polarizer, located on a light emitting side of the display component, having a light transmission axis, and configured to reflect light with a polarization direction perpendicular to a direction of the light transmission axis and allow light with a polarization direction parallel to the direction of the light transmission axis to pass through;
a first polarizer, located on a side, facing away from the display component, of the reflective polarizer, wherein a light transmission axis of the first polarizer is parallel to the light transmission axis of the reflective polarizer; and
a light control component, located between the reflective polarizer and the first polarizer, and having a plurality of light control pixels arranged in an array, wherein each of the light control pixels covers at least one of the display pixels, each of the light control pixels is configured to switch between a first state and a second state, when the light control pixel is in the first state, external ambient light passing through the first polarizer does not change a polarization state after passing through the light control pixel, and when the light control pixel is in the second state, the external ambient light passing through the first polarizer is adjusted, after passing through the light control pixel, to be linearly polarized light perpendicular to the direction of the light transmission axis of the reflective polarizer; wherein the display component comprises: a liquid crystal display panel; the light control component is a liquid crystal control panel, the first state is a state when a display pixel is required for display, and the second state is a state when a display pixel is not required for display; in the first state, a voltage is applied to a display pixel electrode and a first common electrode of the liquid crystal display panel, and a voltage is applied to a light control pixel electrode and a second common electrode of the liquid crystal control panel, so that the liquid crystal display panel converts the linearly polarized light into elliptically polarized light, and the liquid crystal control panel allows the light to pass through; in the second state, the voltage is not applied to the display pixel electrode and the first common electrode of the liquid crystal display panel, and the voltage is not applied to the light control pixel electrode and the second common electrode of the liquid crystal control panel, so that the display component does not emit light.

2. The display device according to claim 1, wherein each of the display pixels comprises a display pixel electrode, and each of the light control pixels comprises a light control pixel electrode; and an orthographic projection of the display pixel electrode on the reflective polarizer overlaps an orthographic projection of the light control pixel electrode on the reflective polarizer.

3. The display device according to claim 2, wherein the liquid crystal control panel is a twisted nematic liquid crystal module.

4. The display device according to claim 1, wherein the light control component further comprises: a plurality of signal lines extending in a first direction and a second direction that cross each other, and the signal lines define the plurality of light control pixels; and at least part of the signal lines are broken lines.

5. The display device according to claim 1, wherein the display device further comprises a second polarizer, wherein the liquid crystal display panel is located between the second polarizer and the reflective polarizer.

6. The display device according to claim 5, wherein a direction of a light transmission axis of the second polarizer is perpendicular to the direction of the light transmission axis of the reflective polarizer.

7. The display device according to claim 6, wherein the display component further comprises a backlight module, and the backlight module is located on a side, facing away from the liquid crystal display panel, of the second polarizer.

8. A driving method for the display device according to claim 1, the driving method comprising:
controlling, by each light control pixel, light of a corresponding display pixel to pass through so that a position of the light control pixel is displayed at a current moment, when the corresponding display pixel is for image display at the current moment; and
adjusting, by each light control pixel, external ambient light passing through the first polarizer to be linearly polarized light perpendicular to the direction of the light transmission axis of the reflective polarizer so that the position of the light control pixel has a mirror function at the current moment, when the corresponding display pixel is not for image display at the current moment.

9. The driving method according to claim 8, wherein when adjusting, by each light control pixel, the external ambient light to be the linearly polarized light perpendicular to the direction of the light transmission axis of the reflective polarizer, the driving method further comprises:
the display pixel corresponding to the light control pixel is in a light blocking state.

10. The driving method according to claim 8, wherein when controlling, by each light control pixel, the light of the corresponding display pixel to pass through when the corresponding display pixel is for image display at the current moment, the driving method further comprises:
at the same time, adjusting, by the light control pixel, the external ambient light passing through the first polarizer to be linearly polarized light parallel to the direction of the light transmission axis of the reflective polarizer.

11. The driving method according to claim 8, wherein before controlling, by each light control pixel, the light of the display pixel to pass through when the corresponding display pixel is for image display at the current moment, the driving method further comprises:
determining, according to a display image to be displayed, a first display pixel among the display pixels for display; and
controlling a light control pixel corresponding to the first display pixel to be in the first state, and controlling remaining light control pixels to be in the second state.

* * * * *